(12) United States Patent
Benedict et al.

(10) Patent No.: US 11,015,875 B2
(45) Date of Patent: May 25, 2021

(54) ELECTROCHEMICAL HEAT PUMP

(71) Applicant: Palo Alto Research Center Incorporated, Palo Alto, CA (US)

(72) Inventors: Michael Benedict, Palo Alto, CA (US); Elif Karatay, Mountain View, CA (US); Eugene S. Beh, Portola Valley, CA (US); Jessica Louis Baker Rivest, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 226 days.

(21) Appl. No.: 16/386,389

(22) Filed: Apr. 17, 2019

(65) Prior Publication Data
US 2020/0333086 A1 Oct. 22, 2020

(51) Int. Cl.
*F28D 20/00* (2006.01)
*F24V 30/00* (2018.01)
*F25B 15/00* (2006.01)
*F25B 30/04* (2006.01)

(52) U.S. Cl.
CPC ............ *F28D 20/003* (2013.01); *F24V 30/00* (2018.05); *F25B 15/00* (2013.01); *F25B 30/04* (2013.01)

(58) Field of Classification Search
CPC ........ F28D 20/003; F24V 30/00; F25B 15/00; F25B 15/002; F25B 30/04; B01D 61/46; B01D 53/1425; B01D 53/263
See application file for complete search history.

(56) References Cited

U.S. PATENT DOCUMENTS

| 2,672,024 A | 3/1954 | Mcgrath | |
|---|---|---|---|
| 4,118,299 A * | 10/1978 | Maget | C02F 1/4604 |
| | | | 204/265 |
| 4,593,534 A * | 6/1986 | Bloomfield | F25B 1/00 |
| | | | 417/48 |
| 4,984,434 A * | 1/1991 | Peterson | F24F 3/1411 |
| | | | 62/271 |
| 6,159,352 A * | 12/2000 | Riera | C07C 319/12 |
| | | | 204/530 |
| 6,187,201 B1 | 2/2001 | Abe et al. | |

(Continued)

FOREIGN PATENT DOCUMENTS

| CN | 206055832 | 3/2017 |
|---|---|---|
| CN | 108187459 | 6/2018 |

(Continued)

OTHER PUBLICATIONS

Office Action from U.S. Appl. No. 16/200,309 dated Nov. 10, 2020, 26 pages.

(Continued)

*Primary Examiner* — Kun Kai Ma
(74) *Attorney, Agent, or Firm* — Mueting Raasch Group

(57) ABSTRACT

A solution flows through a salinate chamber and a desalinate chamber of an electrochemical cell. Solutes are moved from the desalinate chamber to the salinate chamber to create respective solvent and concentrate streams from the desalinate and salinate chambers. The concentrate stream flows to a recombination cell where it is combined with a solvent. The combination causes at least one of an absorption of heat within the recombination cell and emission of heat from the recombination cell.

20 Claims, 6 Drawing Sheets

(56) References Cited

U.S. PATENT DOCUMENTS

| | | | |
|---|---|---|---|
| 7,992,855 B2 | 8/2011 | Awano | |
| 8,142,633 B2 | 3/2012 | Batchelder et al. | |
| 8,769,972 B2* | 7/2014 | Bahar | F25B 1/00 |
| | | | 62/115 |
| 9,340,436 B2* | 5/2016 | Sahu | B01D 61/46 |
| 9,548,620 B2* | 1/2017 | Hu | H02J 7/0068 |
| 9,640,826 B2 | 5/2017 | Yan et al. | |
| 9,670,077 B2 | 6/2017 | Volkel et al. | |
| 9,673,472 B2 | 6/2017 | Volkel et al. | |
| 9,905,876 B2 | 2/2018 | Schubert et al. | |
| 10,821,395 B2 | 11/2020 | Beh | |
| 2003/0098244 A1* | 5/2003 | Ruhr | C11D 3/3956 |
| | | | 205/516 |
| 2005/0183956 A1 | 8/2005 | Katefidis | |
| 2006/0141346 A1* | 6/2006 | Gordon | H01M 6/36 |
| | | | 429/112 |
| 2008/0185346 A1* | 8/2008 | Xiong | C02F 1/4691 |
| | | | 204/554 |
| 2012/0292187 A1* | 11/2012 | Kim | H01M 8/16 |
| | | | 204/527 |
| 2012/0298527 A1* | 11/2012 | James | C25B 9/16 |
| | | | 205/743 |
| 2014/0251819 A1* | 9/2014 | Logan | C25B 1/02 |
| | | | 205/344 |
| 2019/0240614 A1* | 8/2019 | Beh | H01M 8/188 |
| 2020/0001251 A1* | 1/2020 | Demeter | B01D 61/46 |
| 2020/0070094 A1* | 3/2020 | Hussaini | C02F 1/46109 |
| 2020/0164302 A1* | 5/2020 | Benedict | H01M 8/188 |
| 2020/0164312 A1* | 5/2020 | Beh | B01D 61/46 |
| 2020/0333086 A1* | 10/2020 | Benedict | F24V 30/00 |

FOREIGN PATENT DOCUMENTS

| | | | | |
|---|---|---|---|---|
| EP | 3336064 A1 * | 6/2018 | | H01M 8/16 |
| KR | 20150034545 | 4/2015 | | |
| WO | 2014/181898 | 11/2014 | | |
| WO | 2018/032003 | 2/2018 | | |
| WO | 2018/119280 | 6/2018 | | |

OTHER PUBLICATIONS

Al-Jubainawi et al., "Factors governing mass transfer during membrane electrodialysis regeneration of LiCl solution for liquid desiccant dehumidification systems", Sustainable Cities and Society, vol. 28, Aug. 26, 2016.
Btmap-Vi et al., "Ordering and Customer Service Neutral pH Aqueous Redox Flow Battery Materials", Jan. 1, 2017, pp. 639.
International Search Report and Written Opinion dated Mar. 9, 2020 for PCT/2019/063157 dated Mar. 9, 2020, 16 pages.
International Search Report and Written Opinion dated Mar. 9, 2020 for PCT/US2019/062924, 17 pages.
Scialdone et al., "Investigation of electrode material—redox couple systems for reverse electrodialysis processes—Part II: Experiments in a stack with 10-50 ce", Journal of Electroanalystical Chemistry, vol. 704, Jun. 14, 2013, pp. 1-9.
Yang et al., "A Natural Driven Membrane Process for Brackish and Wastewater Treatment: Photovoltaic Powered ED and FO Hybrid System", Environmental Science and Technology, Sep. 4, 2013, pp. 10548-10555.
Al-Karaghouli et al., "Energy consumption and water production cost of conventional and renewable-energy-powered desalination processes", Renewable and Sustainable Energy Reviews 2013, 24, 343-356.
Anderson et al., Capacitive deionization as an electrochemical means of saving energy and delivering clean water. Comparison to present desalination practices: Will it compete?:, Electrochimica Acta 2010, 55 (12), 3845-3856.
Arellano et al., "Effects of pH on the degradation of aqueous ferricyanide by photolysis and photocatalysis under solar radiation", Solar Energy Materials and Solar Cells 2010, 94 (2), 327-332.

Ashrae Standard, "Method of Testing for Rating Desiccant Dehumidifiers Utilizing Heat for the Regeneration Process", 2007.
Beh et al., "A Neutral pH Aqueous Organic—Organometallic Redox Flow Battery with Extremely High Capacity Retention" ACS Energy Lett, 2017, 2, pp. 639-644.
Desai et al., "Electrochemical Desalination of Seawater and Hypersaline Brines with Coupled Electricity Storage", ACS Energy Lett. 3, 2, 2018, pp. 375-379.
Desalination Experts Group, "Desalination in the GCC", 2014, 47 pages.
Dipaola, "Saudi Arabia Gets Cheapest Bids for Solar Power in Auction" Bloomberg, Jan. 16, 2018, 3 pages.
Gong et al., All-Soluble All-Iron Aqueous Redox-Flow Battery, ACS Energy Letters, 2016, 1, pp. 89-93.
Gong et al., "A zinc-iron redox-flow battery under $100 per kW h of system capital cost", Energy & Environmental Science, 2015. 5 pages.
Hilbert et al., "Correlations between the Kinetics of Electrolytic Dissolution and Deposition of Iron: I . The Anodic Dissolution of Iron", Journal of the Electrochemical Society 1971, 118 (12), 1919-1926.
Howell et al., "Overview of the DOE VTO Advanced Battery R&D Program", Jun. 6, 2016 24 pages.
Hu et al, "Long-Cycling Aqueous Organic Redox Flow Battery (AORFB) toward Sustainable and Safe Energy Storage", Journal of the American Chemical Society 2017, 139 (3), 1207-1214.
Khawaji et al., "Advances in seawater desalination technologies", Desalination 2008, 221 (1-3), 47-69.
Kozubal et al., "Low-Flow Liquid Desiccant Air-Conditioning: Demonstrated Performance and Cost Implications" NREL Technical Report, Sep. 2014, 104 pages.
"Lazard's Levelized Cost of Storage—Version 2.0." 2016, 46 pages.
Lee et al., "Desalination of a thermal power plant wastewater by membrane capacitive deionization", Desalination 196, 2006, pp. 125-134.
Logan et al, "Membrane-based processes for sustainable power generation using water", Nature 2012, 488, 313.
Malhotra et al., "Use cases for stationary battery technologies: A review of the literature and existing projects", Renewable and Sustainable Energy Reviews 56, 2016, pp. 705-721.
McGovern et al., "On the cost of electrodialysis for the desalination of high salinity feeds", Applied Energy 136, Dec. 2014, pp. 649-661.
Moore et al., "Evaporation from Brine Solutions Under Controlled Laboratory Conditions; Report 77 for the Texas Water Development Board", May 1968, 77 pages.
Oren, "Capacitive deionization (CDI) for desalination and water treatment—past, present and future (a review)", Desalination 2008, 228 (1-3), 10-29.
Sata, "Application of Ion Exchange Membranes. In Ion Exchange Membranes: Preparation, Characterization, Modification and Application", The Royal Society of Chemistry: Cambridge, 2004.
Schaetzle et al., "Salinity Gradient Energy: Current State and New Trends", Engineering, vol. 1, Issue 2, Jun. 2016, pp. 164-166.
Scialdone et al., "Investigation of electrode material—Redox couple systems for reverse electrodialysis processes. Part I: Iron redox couples", Journal of Electroanalytical Chemistry 2012, 681 (Supplement C), 66-75.
Soloveichik, "Flow Batteries: Current Status and Trends", Chem. Rev. 2015, 115, 20, pp. 11533-11558.
US Dept. Of Energy, "Desiccant Enhanced Evaporative Air-Conditioning (DEVap): Evaluation of a New Concept in Ultra Efficient Air Conditioning", Technical Report NREL/TP-5500-49722, 2011.
US Dept. Of Energy, "Energy Savings Potential and RD&D Opportunities for Commercial Building HVAC Systems", Dec. 2017, 172 pages.
US Dept. Of Interior/US Geological Survey, Estimated Use of Water in the United States in 2010, 2014, 64 pages.
Urban, "Emerging Scientific and Engineering Opportunities within the Water-Energy Nexus", Joule, Dec. 20, 2017, pp. 665-688.

(56) References Cited

OTHER PUBLICATIONS

Vermaas et al., "High Efficiency in Energy Generation from Salinity Gradients with Reverse Electrodialysis", ACS Sustainable Chem. Eng. 1, 2013, pp. 1295-1302.
Viswanathan et al., "Cost and performance model for redox flow batteries", Journal of Power Sources, vol. 247, Dec. 23, 2012, pp. 1040-1051.
Woods, "Membrane processes for heating, ventilation, and air conditioning", Renewable and Sustainable Energy Reviews, vol. 33, 2014, pp. 290-304.
Wu et al., "Kinetic study on regeneration of Fe(II)EDTA in the wet process of NO removal", Chemical Engineering Journal 2008, 140 (1), 130-135.
Beh et al., U.S. Appl. No. 16/200,289, filed Nov. 26, 2018.
Beh et al., U.S. Appl. No. 16/200,309, filed Nov. 26, 2018.
Beh et al., U.S. Appl. No. 16/200,376, filed Nov. 26, 2018.
Beh et al., U.S. Appl. No. 16/378,769, filed Nov. 26, 2018.
Beh et al., U.S. Appl. No. 16/378,769, filed Apr. 9, 2019.

* cited by examiner

ELECTROCHEMICAL HEAT PUMP

SUMMARY

The present disclosure is directed to an electrochemical heat pump. In one embodiment, an electrochemical cell includes a salinate chamber from which a concentrate stream flows and a desalinate chamber separated from the salinate chamber. The electrochemical cell moves solutes from the desalinate chamber to the salinate chamber causing a solvent stream to flow from the desalinate chamber. A recombination cell receives the concentrate stream as an input. The recombination cell combines the concentrate stream with a solvent causing at least one of an absorption of heat within the recombination cell and emission of heat from the recombination cell.

In another embodiment, a method comprises flowing a solution through a salinate chamber and a desalinate chamber of an electrochemical cell. Solutes are moved from the desalinate chamber to the salinate chamber to create respective solvent and concentrate streams from the desalinate and salinate chambers. The concentrate stream flows to a recombination cell where it is combined with a solvent. The combination causes at least one of an absorption of heat within the recombination cell and emission of heat from the recombination cell.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

Figure 1:
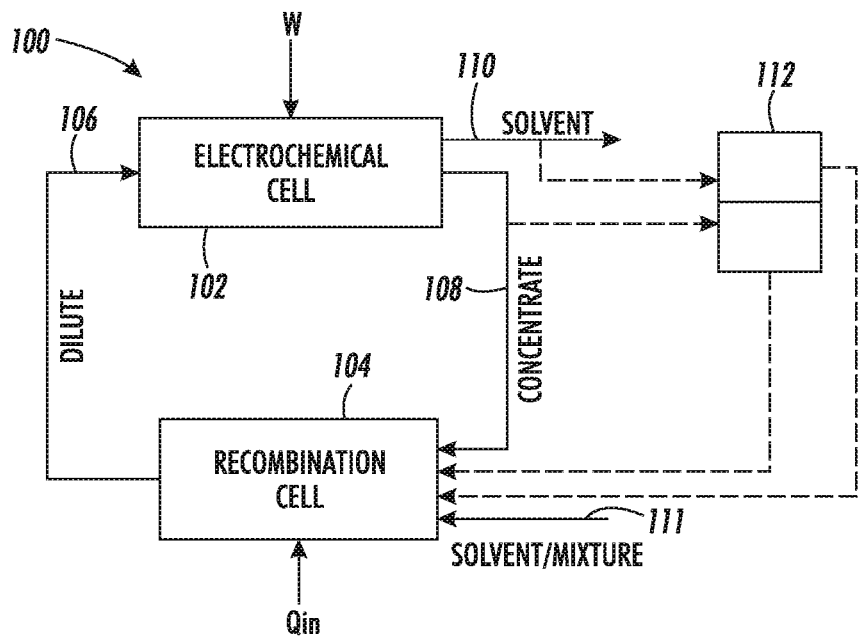
FIG. 1 is a diagram of a heat pump system according to an example embodiment.

The present disclosure relates to heat pumps. Generally, a heat pump is a system that utilizes a heat transfer medium (e.g., gas or liquid) to move heat in a direction opposite that of spontaneous heat transfer. Well-known heat pump systems include vapor-compression cycle machines used in refrigerators and air-conditioning. Other types of heat pump systems include vapor absorption systems where a liquid refrigerant evaporates in a low partial pressure environment, absorbing heat from its surrounding. The vapor is then absorbed in another liquid, which is then heated to cause the refrigerant to evaporate out again. One advantage to absorption systems are that they can be built using no moving parts, other than the refrigerant itself.

The heat pump systems described herein take advantage of electrochemical separation to remove solutes (e.g., salts) from a solution. This can be used to form dilute and concentrate streams, which can be recombined to cause endothermic (and in some cases exothermic) reactions that can be used to absorb or emit heat. The streams can be fed through a loop and separated into dilute and concentrate streams to be used again. In other cases, one or both of the streams may be open loop. For example, an electrochemical separator may be used to desalinate water, with one or both of the high and low saline streams being used elsewhere, e.g., consumed or discarded.

In some embodiments, an electrochemical separator may use a redox-assisted electrodialysis (ED) process that enables membrane-based salination and desalination. For purposes of this disclosure, the terms "salinate," "salination," "salt," etc., are intended to cover any ionic compound, or combination of ionic compounds, that may be dissolved in a solvent (e.g., water) and are not intended to be limited to the colloquial definition of "salt," e.g., NaCl. The salt is not intended to just be a singular species but can be any combination of water-soluble ionic salts, including but not limited to, those encountered in seawater or wastewater. Example cations that can be present in the electrolyte include, but are not limited to, hydronium, lithium, sodium, potassium, magnesium, calcium, ammonium, aluminum, zinc, and iron. Example anions that can be present in the electrolyte include, but are not limited to, hydroxide, chloride, bromide, iodide, carbonate, hydrogencarbonate, acetate, halide oxyanions, sulfur oxyanions, phosphorous oxyanions, and nitrogen oxyanions. For the purposes of this invention, acids like sulfuric acid (cation: hydronium; anion: sulfate or hydrogensulfate) or bases like sodium hydroxide (cation: sodium; anion: hydroxide) should also be considered as salts. In these redox-assisted ED embodiments, an aqueous solution of a redox-active species may be circulated between the anode and cathode of an electrochemical stack to concentrate ionic solutions. Diluted liquid desiccants can be efficiently re-concentrated, avoiding the latent heat input required to evaporate the solvent.

In FIG. 1, a diagram illustrates an electrochemical heat pump system 100 according to an example embodiment. The system 100 includes an electrochemical cell 102 and a recombination cell 104. The electrochemical cell 102 receives a dilute stream 106 which is processed into two output streams, a solvent stream 110 and a concentrate stream 108. Generally, as will be described in greater detail below, the electrochemical cell 102 moves soluble compounds (e.g., salts) from the solvent stream 110 to the concentrate stream 108 through the input of work W, e.g., using electrical power. Note that the solvent stream 110 need not be "pure" solvent, but will at least have a concentration of solutes that is less than that of the dilute stream 106. Similarly, the concentrate stream 108 will have a concentration of solutes that is greater than that of the dilute stream 106, but will still have some portion of solvent as well.

At least the concentrate stream 108 is fed into the recombination cell 104, which combines the concentrate stream 108 with a solvent/mixture 111, causing heat Qin to be absorbed. The solvent/mixture 111 may include the solvent stream 110 and/or a contaminant stream that includes at least some of the solvent. The output of the recombination cell 104 is the dilute stream 106 which includes a mixture of the concentrate stream 108 and the solvent. In embodiments described below, the various streams exiting and entering the electrochemical cell 102 and recombination cell 104 may be connected in various ways depending on different configurations of the recombination cell 104 as well as the sources and sinks (if any) of solvents and concentrates used in the various streams.

One advantage of this heat pump embodiment is that a large amount of potential energy can be stored in concentrated desiccant solutions, e.g., the concentrate stream 108. It is possible to store volumes of concentrated desiccant solution and then provide cooling for long periods of time. The solvent stream 110 can also be stored. As shown in FIG. 1, a storage facility 112 (e.g., tanks) can be used to collect and store fluids from one or both streams 108, 110 and these can be later fed back the recombination cell 104 to increase one of a rate of heat transfer or time of operation provided by the heat pump. During a time when the storage facility 112 is used, the electrochemical cell 102 can be disconnected (e.g., fluid lines switched via valves, physically removed) from the recombination cell 104 and storage 112. The storage facility 112 may also be extended to store fluid from the dilute stream 106. Also note that pumps (not shown) may be used to move fluids through the various streams 108, 110, 106 as well as into and out of the storage facility 112.

Figure 2:
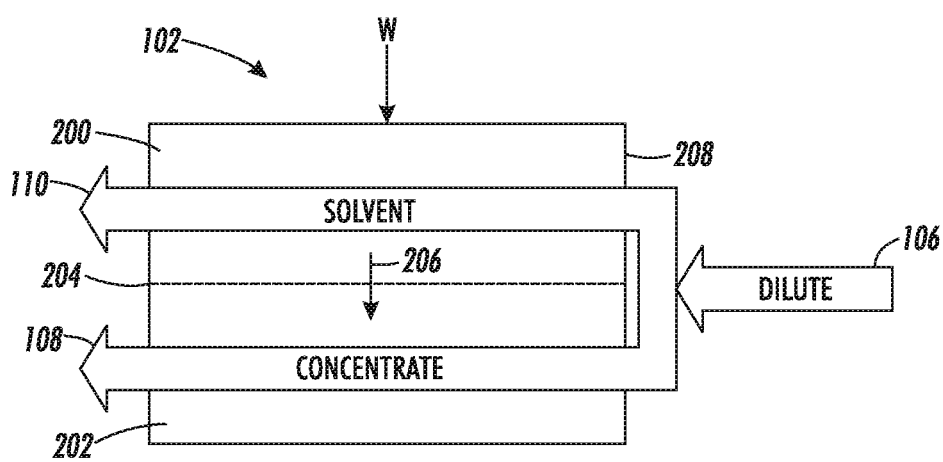
FIG. 2 is a diagram of an electrochemical cell according to an example embodiment.

In FIG. 2, a simplified block diagram shows the operations of the electrochemical cell 102 according to various embodiments. The dilute stream 106 flows into both a salinate chamber 202 and a desalinate chamber 200. The concentrate stream 108 flows from the salinate chamber 202 and the solvent stream 110 flows from the desalinate chamber 200. The chambers 200, 202 are separated by a structure 204 (e.g., membrane) that facilitates passing solutes 206 from the solvent stream 110 to the concentrate stream 108. The chambers 200, 202 are in a housing 208 that contains the fluid flow and has other features that facilitate inputting of work W (e.g., electrical power) to drive the movement of the solutes 206. More specific embodiments of an electrochemical cell are shown and described further below in this disclosure.

Figure 3:
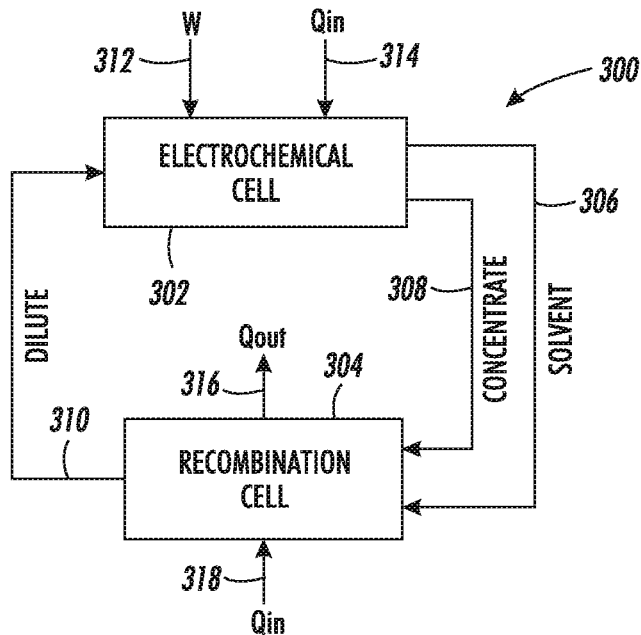
FIG. 3 is a diagram of a heat pump system according to another example embodiment.

In FIG. 3, a block diagram shows a heat pump system 300 according to an example embodiment. In this example, an electrochemical cell 302 and a recombination cell 304 are coupled in a loop with a solvent stream 306, a concentrate stream 308, and a dilute stream 310. The dilute stream 310 may be input to both salinate and desalinate chambers of the electrochemical cell 302, in which case the dilute stream 310 is processed to produce desired concentrations of solute in the solvent stream 306 and the concentrate stream 308. As seen here, the electrochemical cell 302 takes both work 312 and heat 314 as inputs. The recombination cell 304 has two different portions that respectively absorb heat 318 and emit heat 316. This embodiment can also use concentrate and/or solvent storage as shown in FIG. 1.

Figure 4:
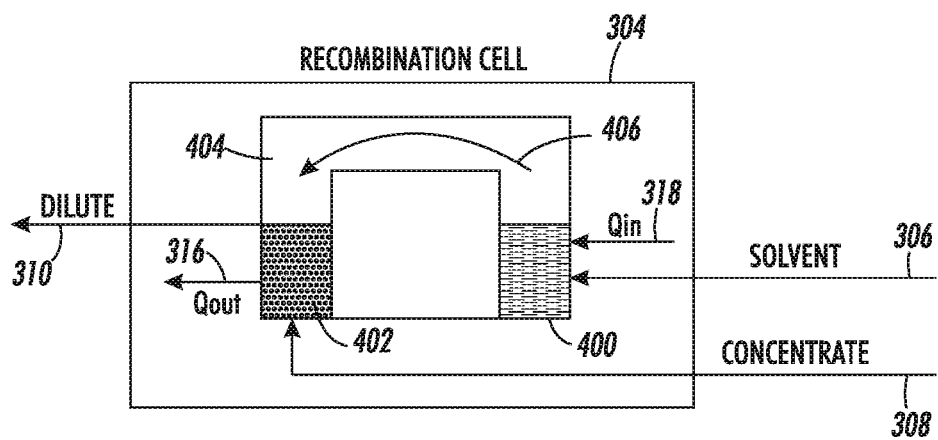
FIG. 4 is a diagram of the recombination cell shown in FIG. 3.

In FIG. 4, a diagram shows details of the recombination cell 304 shown in FIG. 3. The recombination cell 304 includes a first portion 400 into which the solvent stream 306 flows. The concentrate stream 308 flows into a second portion 402 of the cell 304 where combination with the solvent occurs and forms the dilute stream 310. A vapor chamber 404 connects the first and second portions 400, 402. The concentrate in the second portion 402 lowers the vapor pressure in the vapor chamber 404, causing the solvent in the first portion 400 to evaporate, as indicated by vapor 406. The evaporation results in the absorption of heat 318 in the first portion 400. The vapor 406 combines with the concentrate in the second portion 402, which forms the dilute stream 310 and also emits heat 316.

In one embodiment of this cell 304, LiCl is used as the solute and water is used as the solvent. LiCl has a high affinity for water and can effectively lower the water vapor pressure at the LiCl solution surface. Utilizing this effect, the solvent stream 306 is allowed to evaporate and dilute the concentrated LiCl solution 308. The evaporation of water requires heat input 318 and will lower the temperature of evaporation side 400 until it is in equilibrium with the environment, or with the vapor pressure in the vapor chamber 404. Dilution of the concentrated LiCl stream results in heat release 316 which will raise the temperature of the second portion 402 above ambient and allow for heat transfer 316 out of the system. The first and second portions 400, 402 may be thermally isolated to maximize thermal efficiency of the system.

Figure 5:
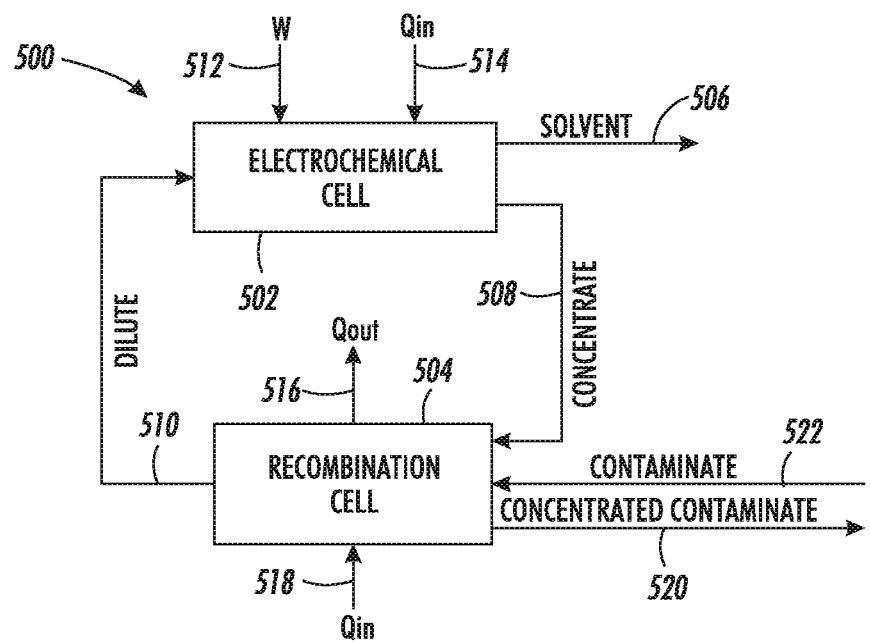
FIG. 5 is a diagram of a heat pump system according to another example embodiment.

In FIG. 5, a block diagram shows a heat pump system 500 according to another example embodiment. In this example, an electrochemical cell 502 and a recombination cell 504 are coupled in a loop with a concentrate stream 508 and a dilute stream 510. A solvent stream 506 exits the electrochemical cell 502 where it may be used elsewhere (e.g., fresh water supply). The dilute stream 510 may be input to both salinate and desalinate chambers of the electrochemical cell 502, in which case the dilute stream 510 is processed to produce desired concentrations of solute in the solvent stream 506 and the concentrate stream 508. The electrochemical cell 502 takes both work 512 and heat 514 as inputs. This embodiment can also use concentrate storage as shown in FIG. 1.

Figure 6:
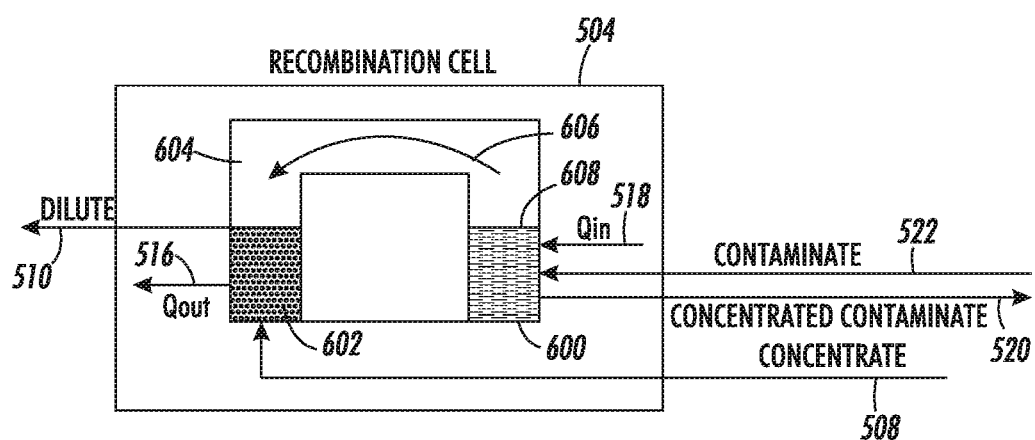
FIG. 6 is a diagram of the recombination cell shown in FIG. 5.

The recombination cell 504 has two different portions that respectively absorb heat 518 and emit heat 516. This cell 504 may also receive a contaminant stream 522 and output a concentrated contaminant stream 520. These streams 520, 522 may include a solute and solvent, the solvent being the same as that extracted by the electrochemical cell. In FIG. 6, a diagram shows details of the recombination cell 504 shown in FIG. 5. The recombination cell 504 includes a first portion 600 through which the contaminant streams 520, 522 flow. The concentrate stream 508 flows into a second portion 602 of the cell 504 where combination with the solvent occurs and forms the dilute stream 510.

A vapor chamber 604 connects the first and second portions 600, 602. The concentrate in the second portion 602 lowers the vapor pressure in the vapor chamber 604, causing the fluid in the contaminant stream 522 in the first chamber 600 to evaporate, as indicated by vapor 606. A solvent-selective membrane 608 (e.g., water-selective) may be used to prevent unwanted vapors from evaporating into the chamber 604. The evaporation results in the absorption of heat 518 in the first portion 600. The vapor 606 combines with the concentrate in the second portion 602, which forms the dilute stream 510 and also emits heat 516. Generally, this embodiment can be used to recover solvent (e.g., water) from the contaminant stream 522 while also acting as a heat pump.

Figure 7:
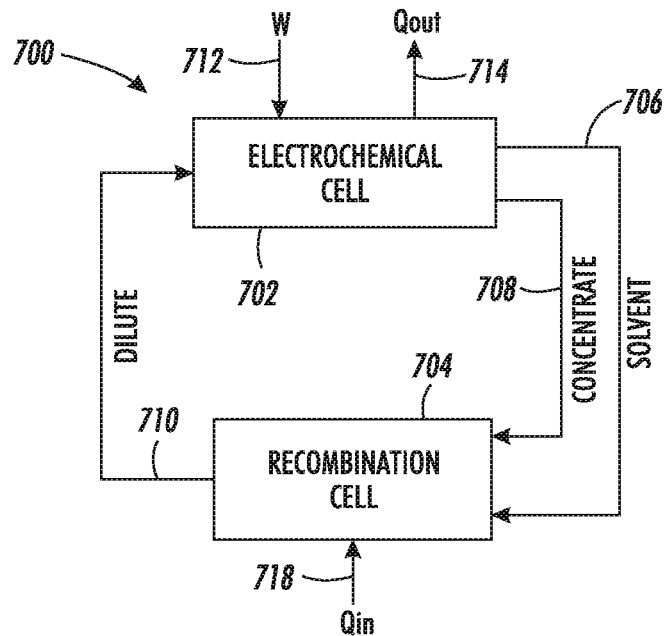
FIGS. 7 and 8 are diagrams of heat pump systems according to other example embodiments.

In FIG. 7, a block diagram shows a heat pump system 700 according to another example embodiment. In this example, an electrochemical cell 702 and a recombination cell 704 are coupled in a loop with a solvent stream 706, a concentrate stream 708, and a dilute stream 710. The dilute stream 710 may be input to both salinate and desalinate chambers of the electrochemical cell 702, in which case the dilute stream 710 is processed to produce desired concentrations of solute in the solvent stream 706 and the concentrate stream 708. The electrochemical cell 702 takes work 712 as an input and outputs heat 714. The recombination cell 704 mixes the solvent and concentration streams 706, 708, causing an endothermic process that absorbs heat 718. In one example, the solute used may be ammonium chloride ($NH_4Cl$), ammonium nitrate ($NH_4NO_3$), or potassium nitrate ($KNO_3$), used with a water solvent. This embodiment can also use concentrate and/or solvent storage as shown in FIG. 1.

Figure 8:
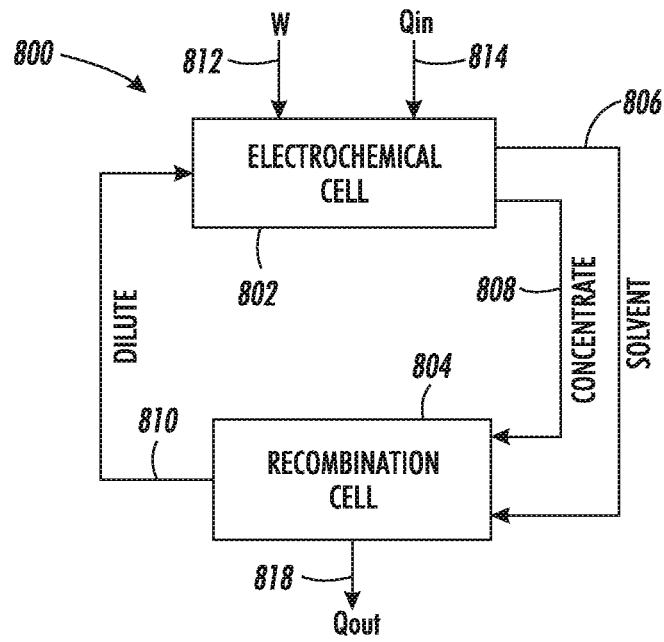

In FIG. 8, a block diagram shows a heat pump system 800 according to another example embodiment. In this example, an electrochemical cell 802 and a recombination cell 804 are coupled in a loop with a solvent stream 806, a concentrate stream 808, and a dilute stream 810. The dilute stream 810 may be input to both salinate and desalinate chambers of the electrochemical cell 802, in which case the dilute stream 810 is processed to produce desired concentrations of solute in the solvent stream 806 and the concentrate stream 808. The electrochemical cell 802 takes both work 812 and heat 814 as inputs. The recombination cell 804 mixes the solvent and concentrate streams 806, 808, causing an exothermic reaction that emits heat 818. In one example, the solute used may be LiCl used with a water solvent. This embodiment can also use concentrate and/or solvent storage as shown in FIG. 1.

Figure 9:
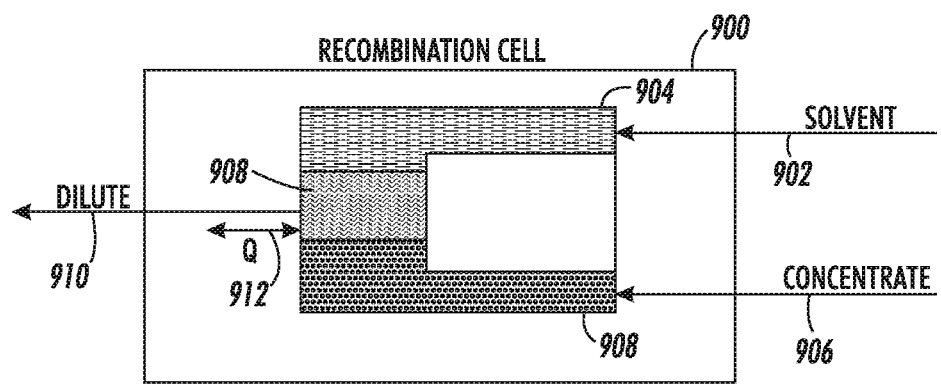
FIG. 9 is a diagram of a recombination cell that may be used in the systems shown in FIGS. 7 and 8.

In FIG. 9, a block diagram shows a recombination cell 900 that may be used in the systems of FIGS. 7 and 8. A solvent stream 902 flows into a first manifold 904 and a concentrate stream 906 flows into a second manifold 908. The streams 902, 906 are mixed in an output manifold 908 where they form a dilute stream 910. The mixing of the streams 902, 906 may be endothermic or exothermic depending on the solute and solvent, in which case heat 912 may be absorbed by or emitted from the cell 900.

Figure 10:
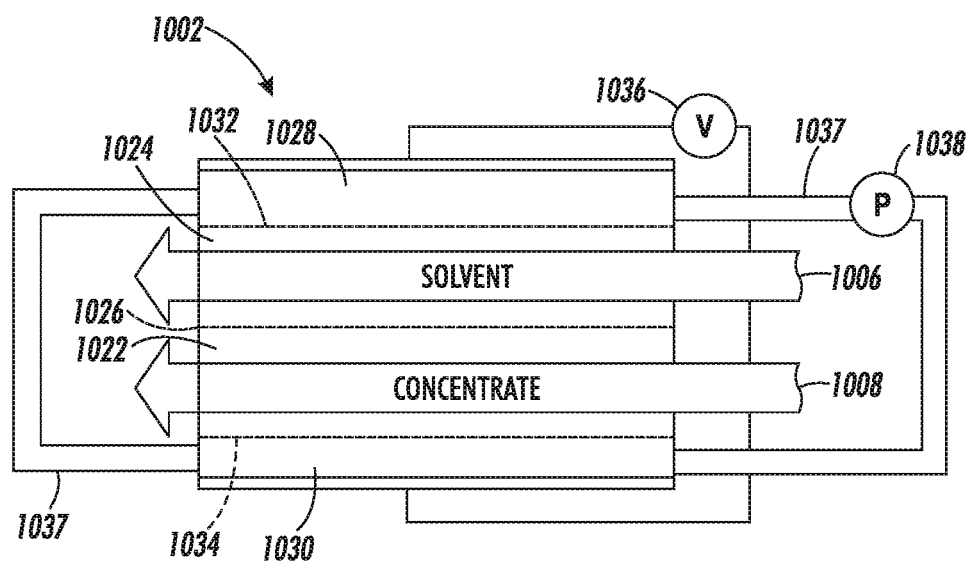
FIG. 10 is a diagram of an electrochemical cell according to another example embodiment.

In the embodiments shown above, an electrochemical cell is generally described that moves solutes from a dilute (or desalinate) stream into a concentrate (or salinate) stream. In FIG. 10, a diagram shows an electrochemical cell 1002 according to an example embodiment. The electrochemical cell 1002 has a salinate chamber 1022 through which the concentrate stream 1008 flows. A desalinate chamber 1024 is separated from the salinate chamber 1022 by a central, ion-selective membrane 1026. The solvent stream 1006 flows through the desalinate chamber 1024. While not shown, a dilute stream flows into the electrochemical cell 1002 and may flow into one or both chambers 1022, 1024.

An anolyte chamber 1028 and a catholyte chamber 1030 are on opposite outer sides of the salinate and desalinate chambers 1022, 1024 and separated therefrom by first and second ionic exchange membranes 1032, 1034. Ion transport between the anolyte and catholyte chambers 1028, 1030 is driven by faradaic reactions induced by a voltage 1036 applied across the anolyte and catholyte chambers 1028, 1030. The ion transport moves a concentrate from the solvent stream 1006 to the concentrate stream 1008.

The location of the anolyte and catholyte chambers 1028, 1030 relative to the salinate and desalinate chambers 1022, 1024 may be swapped. In some embodiments, the outer ion exchange membranes 1032, 1034 are configured as anion exchange membranes (AEM), in which case the central membrane 1026 is a cation exchange membrane (CEM). In other configurations, the central ion exchange membrane 1026 may be an AEM and the outer membranes 1032, 1034 may be CEMs.

The external voltage 1036 induces oxidation or reduction in redox-active shuttle molecules, driving ion movement across the membranes 1026, 1032, 1034 without splitting water or producing other gaseous by products (e.g. chlorine). The ion movement moves solutes from the solvent stream 1006 to the concentrate stream 1008. This movement of solutes can be achieved over multiple stages.

In some embodiments, anolyte and catholyte chambers 1028, 1030 include a single redox shuttle solution that is cycled through both chambers 1028, 1030, e.g., via fluid loop 1037 and a pump 1038. For example, a redox carrier that is dissolved in water can be reduced at the cathode 1030, then shuttled to the anode 1028 where it is re-oxidized and subsequently redelivered to the cathode 1030 to complete the cycle. In other embodiments, two redox-active species may be used that are each confined to the anolyte and catholyte chambers 1028, 1030 respectively. Solid redox carriers can in principle also be employed, but require large amounts of the carriers and frequent switching of salinate and desalinate streams because solid redox-active materials cannot be easily transported from one side of the cell to the other.

One proposed redox shuttle is a positively charged ferrocene derivative such as (bis(trimethylammoniopropyl)ferrocene/bis(trimethylammoniopropyl) ferrocenium, [BTMAP-Fc]$^{2+}$/[BTMAP-Fc]$^{3+}$), which is non-toxic, highly stable, has very rapid electrochemical kinetics and negligible membrane permeability. Other redox shuttle solutions may include ferrocyanide/ferricyanide ([Fe(CN)$_6$]$^{4-}$/[Fe(CN)$_6$]$^{3-}$) or a negatively charged ferrocene derivative. The moving parts of the system may include low pressure pumps for liquid circulation. Additional details of this type of four-channel, electrodialytic, stack with redox shuttle assist can be found in commonly-owned U.S. patent application Ser. No. 16/200,289, filed Nov. 26, 2018, which is hereby incorporated by reference in its entirety.

This method provides similar energy storage on a per volume and per mass basis to a vapor compression system running on Li ion batteries, but does not require moving parts other than pumps.

Figure 11:
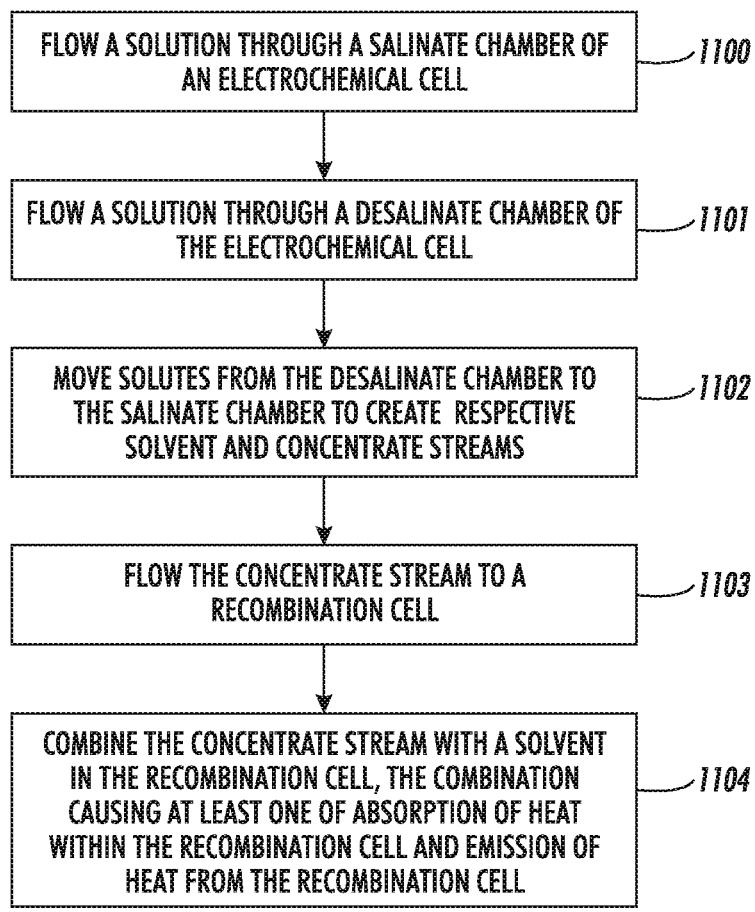
FIG. 11 is a flowchart of a method according to an example embodiment.

In FIG. 11, a flowchart shows a method according to an example embodiment. The method involves flowing 1100 a solution through a salinate chamber of an electrochemical cell and flowing 1101 the solution through a desalinate chamber of the electrochemical cell. Solutes are moved 1102 from the desalinate chamber to the salinate chamber to create respective solvent and concentrate streams from the desalinate and salinate chambers. The concentrate stream flows 1103 to a recombination cell and the concentrate stream is combined 1104 with a solvent in the recombination cell. The combination causing at least one of an absorption of heat within the recombination cell and emission of heat from the recombination cell.

In summary, the present disclosure relates to a heat pump system that uses an electrochemical cell. In some embodiments, the electrochemical cell may be a desalination cell comprising four or more chambers with either (a) one redox-active species that is circulated around the anode and cathode, where it undergoes faradaic reactions at both electrodes, or (b) two redox-active species that are each confined to the anode or cathode respectively. Such a heat pump system may exhibit low energy consumption, continuous operation, non-porous anode/cathode, no splitting of water, or gas creation in the electrochemical cell and generation of highly dense potential energy.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A heat pump comprising:
an electrochemical cell that receives a dilute stream, the electrochemical cell comprising: a salinate chamber from which a concentrate stream flows; and a desalinate chamber separated from the salinate chamber, a solvent stream flowing from the desalinate chamber, the electrochemical cell moving solutes from the desalinate chamber to the salinate chamber; and
a recombination cell receiving the concentrate stream as an input, the recombination cell combining the concentrate stream with a solvent, the combination causing at least one of an absorption of heat into the recombination cell and emission of heat from the recombination cell.

2. The heat pump of claim 1, wherein the concentrate stream reduces a vapor pressure within the recombination cell, the reduction in vapor pressure resulting in evaporation of at least some of the solvent, the evaporation resulting in the absorption of heat in a first portion of the recombination cell.

3. The heat pump of claim 2, wherein the evaporated solvent combines with the concentrate stream in a second portion of the recombination cell causing emission of heat from the second portion of the recombination cell.

4. The heat pump of claim 2, wherein the solvent is provided from solvent stream of the electrochemical cell.

5. The heat pump of claim 2, wherein the solvent is provided from a contaminant stream that includes the solvent.

6. The heat pump of claim 1, wherein the solvent stream comprises water, and wherein the concentrate stream comprises a LiCl solution.

7. The heat pump of claim 1, wherein the combination of the concentrate stream with the solvent comprises a fluid combination that causes an endothermic process that results in the absorption of heat in the recombination cell.

8. The heat pump of claim 1, wherein the electrochemical cell further comprises:
a central, ion-selective membrane that separates the desalinate chamber separated from the salinate chamber; and
an anolyte chamber and a catholyte chamber on opposite outer sides of the salinate and desalinate chambers and separated therefrom by first and second ionic exchange membranes, ion transport between the anolyte and catholyte chambers being driven by faradaic reactions induced by a voltage applied across the anolyte and catholyte chambers, the ion transport moving a concentrate from the solvent stream to the concentrate stream.

9. The heat pump of claim 8, wherein the electrochemical cell further comprises a pump that cycles a redox shuttle solution through the anolyte and catholyte chambers via a fluid loop.

10. The heat pump of claim 1, further comprising at least one storage facility where fluid from one or both of the concentrate and solvent streams are stored, the stored fluid being fed into the recombination cell to increase one of a rate of heat transfer or time of operation provided by the heat pump.

11. A method comprising:
flowing a solution through a salinate chamber and a desalinate chamber of an electrochemical cell;
moving solutes from the desalinate chamber to the salinate chamber to create respective solvent and concentrate streams from the desalinate and salinate chambers;
flowing the concentrate stream to a recombination cell; and
combining the concentrate stream with a solvent in the recombination cell, the combination causing at least one of absorption of heat within the recombination cell and emission of heat from the recombination cell.

12. The method of claim 11, further comprising:
reducing a vapor pressure within the recombination cell responsive to flowing the concentrate stream to the recombination cell; and
evaporating at least some of the solvent responsive to the reduction in vapor pressure, the evaporation resulting in the absorption of heat in a first portion of the recombination cell.

13. The method of claim 12, further comprising combining the evaporated solvent with the concentrate stream in a second portion of the recombination cell causing emission of heat from the second portion of the recombination cell.

14. The method of claim 12, wherein the solvent is provided from solvent stream of the electrochemical cell.

15. The method of claim 12, wherein the solvent is provided from a contaminant stream that includes the solvent.

16. A heat pump comprising:
an electrochemical cell that converts a dilute stream to a concentrate stream and a solvent stream, the electrochemical cell comprising:
a salinate chamber from which the concentrate stream flows;
a desalinate chamber separated from the salinate chamber by a central, ion-selective membrane, the solvent stream flowing out of the desalinate chamber; and
an anolyte chamber and a catholyte chamber on opposite outer sides of the salinate and desalinate chambers and separated therefrom by first and second ionic exchange membranes, ion transport between the anolyte and catholyte chambers being driven by faradaic reactions induced by a voltage applied across the anolyte and catholyte chambers; and
a recombination cell comprising:
a first portion that receives a solvent;
a second portion that receives the concentrate stream and outputs the dilute stream; and
a vapor chamber that couples the first and second portions, the concentrate stream reducing a vapor pressure within the vapor chamber causing evaporation of at least some of the solvent, the evaporation resulting in the absorption of heat in the first portion of the recombination cell.

17. The heat pump of claim 16, wherein the evaporated solvent combines with the concentrate stream in the second portion of the recombination cell causing emission of heat from the second portion of the recombination cell.

18. The heat pump of claim 16, wherein the solvent comprises water, and wherein the concentrate stream comprises a LiCl solution.

19. The heat pump of claim 16, wherein the solvent is provided from the solvent stream of the electrochemical cell.

20. The heat pump of claim 16, wherein the electrochemical cell further comprises a a pump that cycles a redox shuttle solution through the anolyte and catholyte chambers via a fluid loop.

* * * * *